United States Patent
Wong et al.

(10) Patent No.: US 12,181,590 B2
(45) Date of Patent: Dec. 31, 2024

(54) TERRESTRIAL POSITIONING SYSTEM AND METHOD FOR IMPROVED TERRESTRIAL POSITIONING

(71) Applicant: Rohde & Schwarz GmbH & Co. KG, Munich (DE)

(72) Inventors: Kok Meng Wong, Singapore (SG); Stefan Maier, Munich (DE); Peter John Green, Singapore (SG); Rajashekar Durai, Singapore (SG)

(73) Assignee: Rohde & Schwarz GmbH & Co. KG, Munich (DE)

( * ) Notice: Subject to any disclaimer, the term of this patent is extended or adjusted under 35 U.S.C. 154(b) by 197 days.

(21) Appl. No.: 18/080,046

(22) Filed: Dec. 13, 2022

(65) Prior Publication Data

US 2024/0192386 A1  Jun. 13, 2024

(51) Int. Cl.
*G01S 19/02* (2010.01)
*G01S 19/25* (2010.01)
*G01S 19/47* (2010.01)

(52) U.S. Cl.
CPC .............. *G01S 19/47* (2013.01); *G01S 19/02* (2013.01); *G01S 19/256* (2013.01)

(58) Field of Classification Search
CPC ......... G01S 19/47; G01S 19/02; G01S 19/256
See application file for complete search history.

(56) References Cited

U.S. PATENT DOCUMENTS

| | | | |
|---|---|---|---|
| 6,839,024 B2 | 1/2005 | Spilker, Jr. et al. | |
| 7,126,536 B2 | 10/2006 | Rabinowitz et al. | |
| 7,463,195 B2 | 12/2008 | Rabinowitz et al. | |
| 2008/0273080 A1 | 11/2008 | Yang | |
| 2011/0109504 A1 | 5/2011 | Ellis | |

*Primary Examiner* — Mathew Franklin Gordon
(74) *Attorney, Agent, or Firm* — Westman, Champlin & Koehler, P.A.

(57) ABSTRACT

A terrestrial positioning system includes a mobile terrestrial transmitter including a local clock source and an inertial measurement unit, and a synchronization master including a memory configured to store initially known positioning information of the terrestrial transmitter. The terrestrial transmitter determines altered positioning information of the terrestrial transmitter using the first IMU and broadcasting a positioning signal including a timestamp. The synchronization master calculates an expected time of flight of the received positioning signal based on the determined altered positioning information and the stored initially known positioning information of the terrestrial transmitter, to determine a first deviation of the actual time of flight determined from the timestamp and the actual reception time of the received positioning signal with respect to the calculated expected time of flight and to instruct the terrestrial transmitter to delay or prepone the broadcast of the positioning signal.

12 Claims, 2 Drawing Sheets

TERRESTRIAL POSITIONING SYSTEM AND METHOD FOR IMPROVED TERRESTRIAL POSITIONING

FIELD OF THE INVENTION

The present invention relates to a terrestrial positioning system and to methods for improving terrestrial positioning. Such methods and systems may in particular employ broadcast messaging over a cellular network.

BACKGROUND OF THE INVENTION

Global Navigation Satellite Systems (GNSS) are the backbone for position and timing in many industries today. Extended service outages that might be cause by intentional or unintentional man-made or natural effects could result in negative economic and infrastructural impacts. For example, an unintentional error during maintenance of a GPS satellite inadvertently caused GPS clocks to be off by 13 μs, resulting in major problems encountered throughout the GPS user base.

Backup systems for GNSS could be based on using existing terrestrial TV/Radio transmitters emitting 5G broadcast transmission signals. These signals need no longer be considered a "signal-of-opportunity", but could become fully functional PNT signals as basis for terrestrial positioning instead.

It would be desirable to find solutions for improving the resilience of terrestrial positioning systems against external interference.

SUMMARY OF THE INVENTION

According to the disclosure of present invention terrestrial positioning systems and methods for improving terrestrial positioning may be implemented.

Specifically, according to a first aspect of the invention, a terrestrial positioning system includes a first mobile terrestrial transmitter including a first local clock source and a first inertial measurement unit, and a synchronization master including a memory configured to store initially known positioning information of the first mobile terrestrial transmitter. The first mobile terrestrial transmitter is configured to determine altered positioning information of the first mobile terrestrial transmitter using the first IMU and broadcasting a positioning signal including a timestamp of the broadcast timing derived from the first local clock source and the determined altered positioning information. The synchronization master is configured to calculate an expected time of flight of the received positioning signal based on the determined altered positioning information and the stored initially known positioning information of the first mobile terrestrial transmitter, to determine a first deviation of the actual time of flight determined from the timestamp and the actual reception time of the received positioning signal with respect to the calculated expected time of flight and to instruct the first mobile terrestrial transmitter to delay or prepone the broadcast of the positioning signal by the determined first deviation.

According to a second aspect of the invention, a method for improving terrestrial positioning comprises the steps of determining initial terrestrial positioning information of a first mobile terrestrial transmitter and storing the initial terrestrial positioning information in a memory of a stationary synchronization master; determining altered positioning information using a built-in inertial measurement unit (IMU) of the first mobile terrestrial transmitter; broadcasting, by the first mobile terrestrial transmitter, a positioning signal to the synchronization master, the positioning signal including a timestamp of the broadcast timing derived from a built-in local clock source of the first mobile terrestrial transmitter and the determined altered positioning information; calculating, by the synchronization master, an expected time of flight of the received positioning signal from the first mobile terrestrial transmitter based on the determined altered positioning information and the stored initial positioning information; determining, by the synchronization master, a deviation of the actual time of flight determined from the timestamp and the actual reception time of the received positioning signal with respect to the calculated expected time of flight; and sending, by the synchronization master, a synchronization signal back to the first mobile terrestrial transmitter instructing the first mobile terrestrial transmitter to delay or prepone the broadcast of the positioning signal by the determined deviation.

Amongst others, there are several specific advantages associated with such terrestrial positioning systems and methods for improving terrestrial positioning. By using mobile terrestrial transmitters, the broadcasting of the positioning signals is more difficult to disturb by jamming, spoofing or physically manipulating the terrestrial transmitters. The synchronization may be resolved by a dedicated synchronization master that is stationary and therefore knows its own position with constant accuracy. Synchronization is performed by determining deviations in the actual time of flight of positioning signals with respect to the expected time of flight based on the local timing and positioning information in the mobile terrestrial transmitters.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the accompanying drawings. Elements in the drawings are illustrated for simplicity and clarity and have not necessarily been drawn to scale.

In all figures of the drawings elements, features and components which are the same or at least have the same functionality have been provided with the same reference symbols, unless explicitly stated otherwise.

DETAILED DESCRIPTION OF THE EMBODIMENTS

Terrestrial transmitters within the meaning of the present disclosure comprise any type of sender devices capable of broadcasting utilizing signal transmission via radio waves from a terrestrial, i.e., earth-based station to any number of radio receivers. Specifically, terrestrial transmission within the meaning of the present disclosure is to be understood as a concept that encompasses all signal transmission technologies used to broadcast content over short to long distances using radio waves, either with analog or digital content. Terrestrial transmitters within the meaning of the present disclosure may be used for various purposes, including, but not limited to, communication broadcasting, signalling, TV broadcasting, radio broadcasting, military applications, emergency communication services, ocean navigation, aviation, and positioning/navigation/timing (PNT) services.

Global Navigation Satellite Systems (GNSS) such as the Global Positioning System (GPS), the European GNSS Galileo, the Global Orbiting Navigation Satellite System (GLONASS) or the Chinese GNSS Beidou-2 are popular and widely used systems for providing positioning, navigation and timing (PNT) services to a host of applications, industries and infrastructures. GNSS are widespread and provide worldwide coverage with usually little downtime. Such systems can be implemented in a wide spectrum of receiver devices with various degrees of precision and implementation costs.

GNSS have—despite its obvious strengths—some weaknesses: For example, dense multipath environments negatively impact the positioning performance provided by a GNSS, due to interactions between components of the GNSS signal emanating from the device to be tracked in line-of-sight (LOS) and nearby multipath components of the same GNSS signal that occur due to reflection and/or scattering caused by objects in the surroundings. Additionally, the relatively low power levels of GNSS signals at the receiving end cause GNSS PNT to be fairly vulnerable to unintentional and intentional threats such as radio-frequency interference, jamming and spoofing.

Guaranteeing reliable PNT for critical services and infrastructure as well as for generally adverse environments such as military conflict zones require alternative solutions that may complement or back up GNSS. Specifically, such alternative solutions should provide accurate time synchronization over a wide coverage area as well as high positioning accuracy, ideally down to the centimeter level. The solutions need to be robust against radio-frequency interference and readily available with little to no start-up/set-up time.

Figure 1:
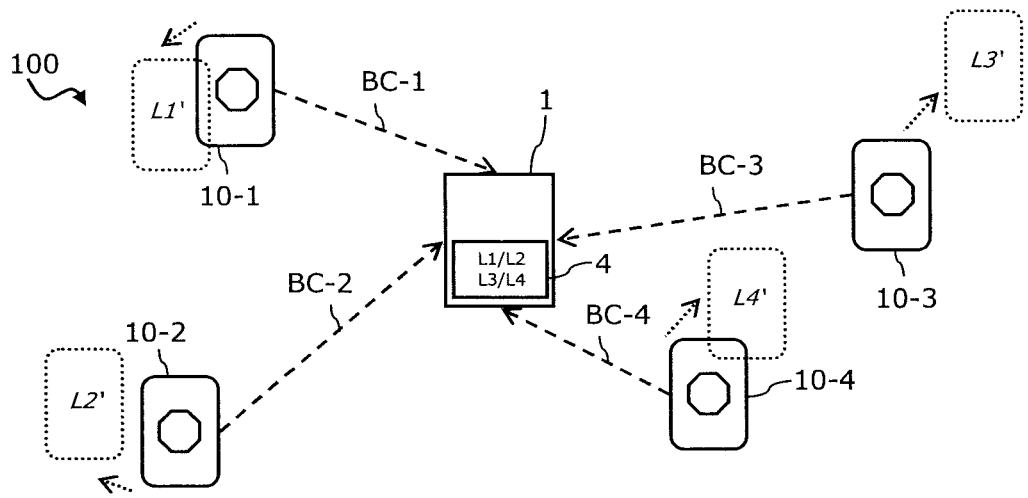
FIG. 1 schematically illustrates a terrestrial positioning system according to some embodiments of the invention.

FIG. 1 schematically illustrates a terrestrial positioning system 100. The terrestrial positioning system 100 may in particular be based on a digital wireless cellular network such as a 4G and/or 5G network. A number of terrestrial transmitters 10-1, 10-2, 10-3, 10-4 is shown to be broadcasting positioning signals BC-1, BC-2, BC-3, and BC-4, respectively. The broadcasting positioning signals BC-1, BC-2, BC-3, BC-4 may be digital television (TV) signals including 3GPP multicast/broadcast signals, such as FeMBMS signals ("Further evolved Multimedia Broadcast Multicast Service") included in DVB-T2 extension frames or NB-IoT signals ("Narrowband Internet-of-Things"). Moreover, the broadcasting positioning signals BC-1, BC-2, BC-3, BC-4 may include a guard band relating to another broadcasting service such as for example DVB-T2, and the guard band may include the NB-IoT signal. FeMBMS as used herein may refer to a 3GPP point-to-multipoint service for efficient cellular multicast/broadcast. The service involves deploying IP multicast, forming dynamic single-frequency networks (SFNs) across cells, and the like measures. NB-IoT as used herein may refer to a 3GPP Low Power Wide Area Network (LP-WAN) service for battery-efficient machine-to-machine (M2M) communication. DVB-T2 as used herein may refer to an ETSI standard for broadcast transmission of digital terrestrial television and suited for carrying HDTV signals.

Figure 4:
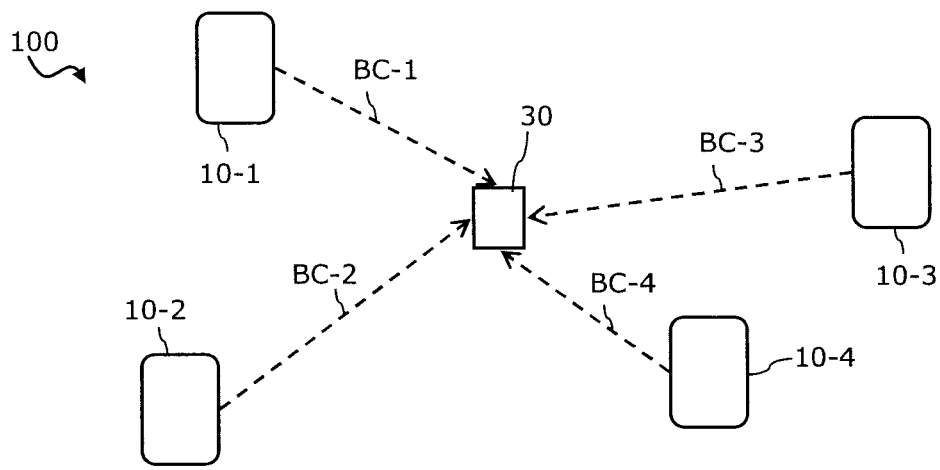
FIG. 4 schematically illustrates the concept of a position determination operation for a mobile broadcast receiver using the terrestrial positioning system of FIG. 1.

Although a number of four terrestrial transmitters is exemplarily shown in FIG. 1, more or less than that number is equally possible. Particularly, the number of terrestrial transmitters may be three or more in order to enable trilateration or triangulation procedures based on a time difference of flight method upon receipt of at least three different broadcasting positioning signals from at least three differently positioned terrestrial transmitters. FIG. 4 schematically illustrates the configuration of the terrestrial positioning system 100 when a mobile broadcast receiver 30 receives broadcasting positioning signals BC-1, BC-2, BC-3, BC-4 from the terrestrial transmitters 10-1, 10-2, 10-3, and 10-4, respectively. In the following, the method of trilateration using three different broadcasting positioning signals received at the mobile broadcast receiver 30 for determining absolute position information of the mobile broadcast receiver 30 will be explained.

The mobile broadcast receiver 30 may be any type of user equipment (UE), in particular a mobile, a mobile console, a mobile device, a cellular phone, a personal digital assistant (PDA), an automotive communication system, a wearable, a wireless communication device, a terminal device in a 5G network (or any similar future evolved public land mobile network) or any similar device.

The broadcasting positioning signals BC-1, BC-2, BC-3, BC-4 include a timestamp of an absolute instant in time (time of transmission, TOT) when the respective broadcasting positioning signal has been emanated by the terrestrial transmitter. Time of arrival (TOA) as used herein may refer to an absolute instant in time when a broadcasting positioning signal has been received by a mobile broadcast receiver 30. The TOA corresponds to a sum of the TOT and a time of flight from the respective terrestrial transmitter (TOF), i.e. TOA=TOT+TOF.

Time difference of arrival (TDOA) as used herein may refer to a difference between TOAs from different terrestrial transmitters i and j, which effectively cancels the TOT: $TDOA_{ij} = TOA_i - TOA_j = TOT + TOF_i - TOT + TOF_j) = TOF_i - TOF_j$.

The broadcasting positioning signals BC-1, BC-2, BC-3, BC-4 include positioning information of the respective terrestrial transmitters 10-1, 10-2, 10-3, 10-4. For example, the broadcasting positioning signals BC-1, BC-2, BC-3, BC-4 may include a positioning reference signal (PRS) including such information. A PRS as used herein may refer to a pseudo-random QPSK sequence that is mapped into time-frequency resources of a 4G/5G signal in diagonal patterns with shifts in frequency and time. Such mappings may be time-variant and dependent on a cryptographic key so that continuously tracking the PRS would require knowledge of the cryptographic key. By deriving the time-frequency pattern of the PRS from a pseudo-random sequence, usage may be restricted to subscribed users, thereby hardening the system against potential spoofing.

PRS facilitate ranging measurements of a mobile broadcasting receiver to improve positioning performance. PRS are transmitted in pre-defined "positioning occasions". Positioning occasions occur with a periodicity TPRS (subframes, or milli-seconds) and then extend across a number NPRS of consecutive subframes. A starting subframe of PRS transmission, relative to the subframe at position 0, is given by the cell specific PRS subframe offset APRS. A PRS configuration index IPRS defines the PRS transmission schedule (i.e., APRS and TPRS).

Each $TDOA_{ij}$ locates the mobile broadcast receiver 30 on a hyperbola with the terrestrial transmitters i and j being the focal points of the hyperbola. If the terrestrial position of each of the terrestrial transmitters 10-1, 10-2, 10-3, 10-4 is known by virtue of the positioning information included in the received broadcasting positioning signals BC-1, BC-2, BC-3, BC-4, the geographic position of the mobile broadcast receiver 30 may be determined to be at the intersection of at least three hyperbolae.

Each of the terrestrial transmitters 10-1, 10-2, 10-3, 10-4 may be set up at a known physical terrestrial location L1, L2, L3, and L4, respectively. The terrestrial positioning system 100 further includes a synchronization master 1 which is physically stationary at a known location relative to the physical terrestrial locations L1, L2, L3, and L4 of the terrestrial transmitters 10-1, 10-2, 10-3, and 10-4, respectively. The synchronization master 1 includes a memory 4 that stores the initially known physical terrestrial locations L1, L2, L3, and L4 associated with each of the terrestrial transmitters 10-1, 10-2, 10-3, and 10-4 in the terrestrial positioning system 100.

In order to increase resilience against outside interference, specifically in adverse environments, it would be desirable to have the terrestrial transmitters 10-1, 10-2, 10-3, 10-4 be mobile, i.e. to be able to move the physical terrestrial locations from the initially known locations L1, L2, L3, and L4 to new locations L1', L2', L3', and L4'. For trilateration to still be possible after such relocation, the change in location needs to be tracked as accurately as possible. Moreover, conventional time synchronization techniques that rely on wired connection between the devices to be synchronized become impractical for mobile transmitters. Thus, alternative solutions for time synchronization as well as location tracking need to be found.

Figure 2:
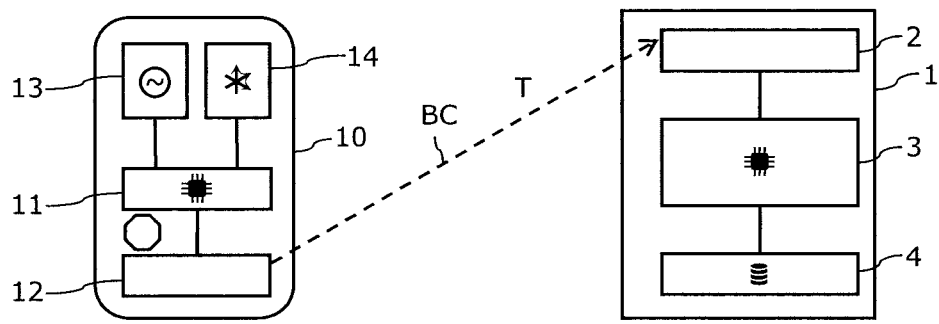
FIG. 2 schematically illustrates communication between a terrestrial transmitter and a synchronization master in a terrestrial positioning system according to some embodiments of the invention.

FIG. 2 schematically illustrates communication between a terrestrial transmitter 10 and a synchronization master 1 in a terrestrial positioning system such as the terrestrial positioning system 100 of FIG. 1 in more detail. In particular, each of the terrestrial transmitters 10-1, 10-2, 10-3, and 10-4 may be implemented like the terrestrial transmitter 10 of FIG. 2.

The terrestrial transmitter 10 includes a central transmitter processor 11, a communication module 12, a local clock source 13 such as a crystal oscillator and an inertial measurement unit (IMU) 14. The local clock source 13 and the IMU 14 are coupled to the transmitter processor 11. The local clock source 13 provides the transmitter processor 11 with a local clock to timestamp the broadcasting signals BC. The IMU 14 is designed to measure linear and angular acceleration rates, determine the local positioning with respect to the initially known locations and provide the transmitter processor 11 with positioning information to be embedded in the broadcasting signals BC. When a GNSS signal is available, the local clock source 13 and the IMU 14 may be re-calibrated using the GNSS.

The transmitter processor 11 controls the communication module 12 to broadcast a broadcasting positioning signal BC with a broadcasting timestamp as provided by the local clock source 13 and positioning information representing the current terrestrial location of the terrestrial transmitter 10 based on measurements by the IMU 14. The broadcasting positioning signal BC is then received by a receiver module 2 in the synchronization master 1 after a time of flight T that depends on the pseudorange between the terrestrial transmitter 10 and the stationary synchronization master 1. The synchronization master 1 includes a master processor 3 that calculates the pseudorange on the basis of the measured time of flight T determined from the difference between the broadcasting timestamp embedded in the broadcasting positioning signal BC and the time of receipt at the receiver module 2.

Figure 3:
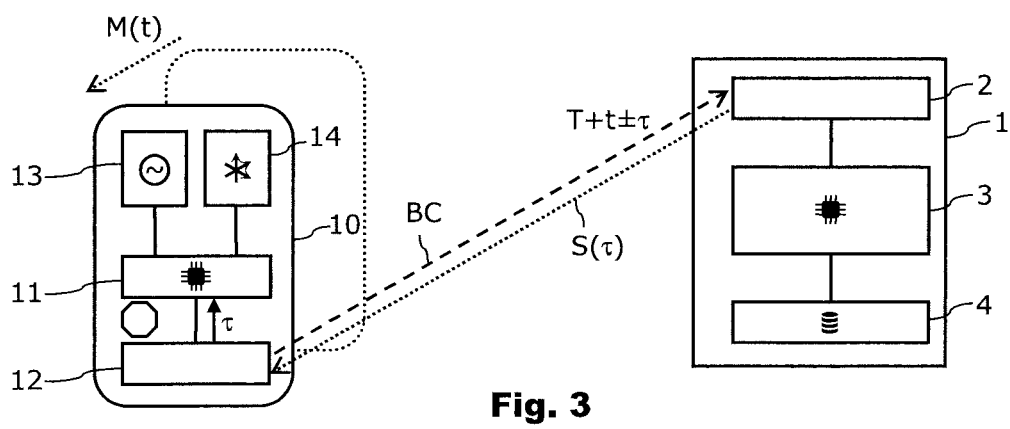
FIG. 3 schematically illustrates a synchronization procedure between the terrestrial transmitter and the synchronization master of FIG. 2 according to some embodiments of the invention.

Additionally, the master processor 3 then compares the pseudorange calculated from the timing information with the deviation of the location information stored in the memory 4 of the synchronization master 1 from the embedded positioning information of the terrestrial transmitter 10 in the broadcasting positioning signal BC. FIG. 3 exemplarily depicts a scenario where the terrestrial location L of the terrestrial transmitter has changed to L' due to a movement M(t) of the terrestrial transmitter 10. The movement M(t) depends on the change t in the time of flight of a broadcasting positioning signal BC from the terrestrial transmitter 10 to the synchronization master 1.

However, since the local clock source 13 of the terrestrial transmitter 10 is not synchronized to the clock available to the synchronization master 1 and/or since the measurements of the IMU 14 are not entirely accurate, the actual time of flight from the new terrestrial location L' may deviate by a value of $\tau$. The master processor 3 of the synchronization master 1 will be able to determine this timespan $\tau$ as deviation from the expected time of flight T+t which is calculated from the actual measurement values of the local clock source 13 and the IMU 14. The master processor 3 then instructs the receiver module 2 to send back a synchronization signal $S(\tau)$ to the terrestrial transmitter 10 indicating the deviation to the terrestrial transmitter 10. The transmitter processor 11 is then able to delay or prepone the sending of the broadcasting positioning signal BC by the respective value of $\tau$. That way, if the terrestrial transmitters 10 will always be time synchronised, irrespective of inaccuracies in the in-built timing and localization means.

An Inertial Measurement Unit (IMU) is a device that typically consists of gyroscopes to measure and report angular rate, accelerometers to measure and report specific force and/or magnetometers to measure and report magnetic field surrounding the unit. Using the measurement results of the various sensors in an IMU allows calculation of the positional change of the IMU with respect to a pre-defined starting point. The addition of a magnetometer and filtering algorithms to determine orientation information results in a device known as an Attitude and Heading Reference Systems (AHRS). In case the terrestrial transmitter 10 is carried by a mobile land-based platform such as for example a truck, a trailer, a train wagon or a container, the IMU 14 may also take into account time-resolved speed information from an odometer of the mobile land-based platform to increase the accuracy of the positioning information.

The transmitter processor 12 and the master processor 3 may be general purpose processors, digital signal processors (DSPs), application specific integrated circuits (ASICs), field programmable gate arrays (FPGAs) or other programmable logic device, discrete gate or transistor logic circuitry, discrete hardware components, or any combination thereof designed to perform the functions described herein. A general purpose processor may be a microprocessor; alternatively, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The memory 4 may include a volatile memory, such as a random access memory (RAM), or a non-volatile memory, such as a flash memory, a hard disk drive (HDD), or a solid-state drive (SSD), or any combination of the foregoing types of memories. The memory 4 may store a program or code, and the microprocessor 3 may implement a function of the synchronization master 1 by executing the program or code. In addition, the memory may exist independently, or may be integrated with the microprocessor.

The communication module 12 may be configured to establish a communication channel with the receiver module 2 of the synchronization master 1, thereby facilitating transmission of a broadcasting signal BC from the terrestrial transmitter 10 to the synchronization master 1. The communication module 12 may be a module functioning as a transceiver over any suitable signalling wide-range technology, such as, for example, wireless local area network (WLAN), Wi-Fi, LTE, or 5th Generation communication.

Figure 5:
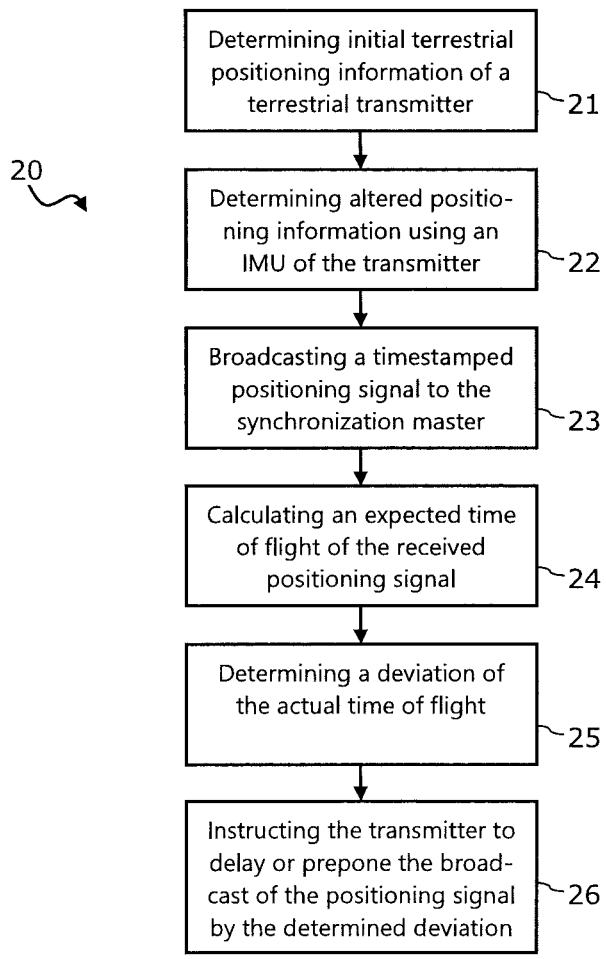
FIG. 5 shows a flowchart of procedural stages of a method for improving terrestrial positioning according to some further embodiment of the invention.

FIG. 5 schematically illustrates procedural stages of a method 20 for improving terrestrial positioning, particularly using terrestrial positioning systems as shown and explained in conjunction with FIGS. 1, 2, 3 and 4. The terrestrial positioning to be improved by the method 20 may be used for improving the accuracy of a position determination of a mobile digital broadcast receiver 30 receiving broadcast signals within the terrestrial positioning system. The method 20 may in particular be performed using the terrestrial positioning system 100 of FIG. 1. The method 20 may advantageously be used for terrestrial positioning in a scenario where the use of global positioning is technically not possible or not desirable.

In the method 20, a first step 21 includes determining initial terrestrial positioning information of a terrestrial transmitter. This initial terrestrial positioning information is then stored in a memory of a stationary synchronization master. Then, in a second step 22, the terrestrial transmitter determines altered positioning information using a built-in inertial measurement unit (IMU) of the terrestrial transmitter. In a third step 23, the terrestrial transmitter broadcasts a positioning signal to the synchronization master. This positioning signal includes a timestamp of the broadcast timing derived from a built-in local clock source of the terrestrial transmitter and the determined altered positioning information.

In a fourth step 24, the synchronization master calculates an expected time of flight of the received positioning signal from the terrestrial transmitter based on the determined altered positioning information and the stored initial positioning information. The synchronization master then determines in a fifth step 25, a deviation of the actual time of flight determined from the timestamp and the actual reception time of the received positioning signal with respect to the calculated expected time of flight.

Then, in a sixth step 26 the synchronization master sends a synchronization signal back to the terrestrial transmitter, instructing the terrestrial transmitter to delay or prepone the broadcast of the positioning signal by the determined deviation.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections between various elements as shown and described with respect to the drawings may be a type of connection suitable to transfer signals from or to the respective nodes, units or devices, for example via intermediate devices. Accordingly, unless implied or stated otherwise the connections may for example be direct connections or indirect connections.

Because the apparatuses implementing the present invention are, for the most part, composed of electronic components and circuits known to those skilled in the art, details of the circuitry and its components will not be explained in any greater extent than that considered necessary as illustrated above, for the understanding and appreciation of the underlying concepts of the present invention and in order not to obfuscate or distract from the teachings of the present invention.

Also, the invention is not limited to physical devices or units implemented in non-programmable hardware, but can also be applied in programmable devices or units able to perform the desired device functions by operating in accordance with suitable program code. Furthermore, the devices may be physically distributed over a number of apparatuses, while functionally operating as a single device. Devices functionally forming separate devices may be integrated in a single physical device. Those skilled in the art will recognize that the boundaries between logic or functional blocks are merely illustrative and that alternative embodiments may merge logic or functional blocks or impose an alternate decomposition of functionality upon various logic or functional blocks.

In the specification, claims, and accompanying drawings of this application, any reference signs shall not be construed as limiting the claims. Ordinal terms such as "first", "second", "third" and the like are intended to distinguish between similar objects but do not necessarily indicate a specific order, importance, ranking or sequence. Unless stated otherwise, such terms representing ordinal numbers are used to arbitrarily distinguish between the elements such terms describe. Thus, these terms are not necessarily intended to indicate temporal or other prioritization of such elements. The words "comprising" and "including" does not exclude the presence of other elements or steps then those listed in a claim. Furthermore, the terms "a" or "an", as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. The mere fact that certain measures are recited in mutually different claims does not indicate that a combination of these measures cannot be used to advantage. The order of method steps as presented in a claim does not prejudice the order in which the steps may actually be carried out, unless specifically recited in the claim.

Skilled artisans will appreciate that the illustrations of chosen elements in the drawings are only used to help to improve the understanding of the functionality and the arrangements of these elements in various embodiments of the present invention. Also, common and well understood elements that are useful or necessary in a commercially feasible embodiment are generally not depicted in the drawings in order to facilitate the understanding of the technical concept of these various embodiments of the present invention. It will further be appreciated that certain procedural stages in the described methods may be described or depicted in a particular order of occurrence while those skilled in the art will understand that such specificity with respect to sequence is not actually required.

What is claimed is:

1. A terrestrial positioning system comprising:
a first mobile terrestrial transmitter including a first local clock source and a first inertial measurement unit; and
a synchronization master including a memory configured to store initially known positioning information of the first mobile terrestrial transmitter,
the first mobile terrestrial transmitter being configured to determine altered positioning information of the first mobile terrestrial transmitter using the first IMU and broadcasting a positioning signal including a timestamp of the broadcast timing derived from the first local clock source and the determined altered positioning information, and
the synchronization master being configured to calculate an expected time of flight of the received positioning signal based on the determined altered positioning information and the stored initially known positioning information of the first mobile terrestrial transmitter, to determine a first deviation of the actual time of flight determined from the timestamp and the actual reception time of the received positioning signal with respect to the calculated expected time of flight and to instruct the first mobile terrestrial transmitter to delay or prepone the broadcast of the positioning signal by the determined first deviation.

2. The terrestrial positioning system of claim 1, further comprising a second mobile terrestrial transmitter including a second local clock source and a second IMU being configured to determine altered positioning information of the second mobile terrestrial transmitter using the second IMU and broadcasting a positioning signal including a timestamp of the broadcast timing derived from the second local clock source and the determined altered positioning information.

3. The terrestrial positioning system of claim 2, further comprising a third mobile terrestrial transmitter including a third local clock source and a third IMU being configured to determine altered positioning information of the third mobile terrestrial transmitter using the third IMU and broadcasting a positioning signal including a timestamp of the broadcast timing derived from the third local clock source and the determined altered positioning information.

4. The terrestrial positioning system of claim 3, further comprising a mobile broadcast receiver configured to perform trilateration upon receipt of delayed or preponed positioning signals broadcast from the first, second and third mobile terrestrial transmitters.

5. The terrestrial positioning system of claim 3, wherein the first, second and third terrestrial transmitters are each mounted on a mobile land-based platform.

6. The terrestrial positioning system of claim 1, wherein the broadcast positioning signal is a FeMBMS signal or a NB-IoT signal.

7. A method for improving terrestrial positioning, the method comprising:
determining initial terrestrial positioning information of a first mobile terrestrial transmitter and storing the initial terrestrial positioning information in a memory of a stationary synchronization master;
determining altered positioning information using a built-in inertial measurement unit (IMU) of the first mobile terrestrial transmitter;
broadcasting, by the first mobile terrestrial transmitter, a positioning signal to the synchronization master, the positioning signal including a timestamp of the broadcast timing derived from a built-in local clock source of the first mobile terrestrial transmitter and the determined altered positioning information;
calculating, by the synchronization master, an expected time of flight of the received positioning signal from the first mobile terrestrial transmitter based on the determined altered positioning information and the stored initial positioning information;
determining, by the synchronization master, a deviation of the actual time of flight determined from the timestamp and the actual reception time of the received positioning signal with respect to the calculated expected time of flight; and
sending, by the synchronization master, a synchronization signal back to the first mobile terrestrial transmitter instructing the first mobile terrestrial transmitter to delay or prepone the broadcast of the positioning signal by the determined deviation.

8. The method of claim 7, further comprising:
determining initial terrestrial positioning information of a second mobile terrestrial transmitter and storing the initial terrestrial positioning information in the memory of the stationary synchronization master;
determining altered positioning information using a built-in inertial measurement unit (IMU) of the second mobile terrestrial transmitter;
broadcasting, by the second mobile terrestrial transmitter, a positioning signal to the synchronization master, the positioning signal including a timestamp of the broadcast timing derived from a built-in local clock source of the second mobile terrestrial transmitter and the determined altered positioning information;
calculating, by the synchronization master, an expected time of flight of the received positioning signal from the second mobile terrestrial transmitter based on the determined altered positioning information and the stored initial positioning information;
determining, by the synchronization master, a deviation of the actual time of flight determined from the timestamp and the actual reception time of the received positioning signal with respect to the calculated expected time of flight; and
sending, by the synchronization master, a synchronization signal back to the second mobile terrestrial transmitter instructing the second mobile terrestrial transmitter to delay or prepone the broadcast of the positioning signal by the determined deviation.

9. The method of claim 8, further comprising:
determining initial terrestrial positioning information of a third mobile terrestrial transmitter and storing the initial terrestrial positioning information in the memory of the stationary synchronization master;
determining altered positioning information using a built-in inertial measurement unit (IMU) of the third mobile terrestrial transmitter;
broadcasting, by the third mobile terrestrial transmitter, a positioning signal to the synchronization master, the positioning signal including a timestamp of the broadcast timing derived from a built-in local clock source of the third mobile terrestrial transmitter and the determined altered positioning information;

calculating, by the synchronization master, an expected time of flight of the received positioning signal from the sec third ond mobile terrestrial transmitter based on the determined altered positioning information and the stored initial positioning information;

determining, by the synchronization master, a deviation of the actual time of flight determined from the timestamp and the actual reception time of the received positioning signal with respect to the calculated expected time of flight; and sending, by the synchronization master, a synchronization signal back to the third mobile terrestrial transmitter instructing the third mobile terrestrial transmitter to delay or prepone the broadcast of the positioning signal by the determined deviation.

10. The method of claim 9, further comprising performing, by a mobile broadcast receiver, trilateration upon receipt of delayed or preponed positioning signals broadcast from the first, second and third mobile terrestrial transmitters.

11. The method of claim 9, wherein the first, second and third terrestrial transmitters are each mounted on a mobile land-based platform.

12. The method of claim 7, wherein the broadcast positioning signal is a FeMBMS signal or a NB-IoT signal.

* * * * *